(12) United States Patent
Tamaoki et al.

(10) Patent No.: US 8,406,977 B2
(45) Date of Patent: Mar. 26, 2013

(54) DRIVING SUPPORT APPARATUS

(75) Inventors: Fumihiro Tamaoki, Nagoya (JP);
Shouichirou Hanai, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/333,085

(22) Filed: Dec. 21, 2011

(65) Prior Publication Data

US 2012/0166072 A1 Jun. 28, 2012

(30) Foreign Application Priority Data

Dec. 28, 2010 (JP) ................................ 2010-291956

(51) Int. Cl.
*B60T 7/12* (2006.01)
(52) U.S. Cl. .......................................................... 701/96
(58) Field of Classification Search ...................... 701/96
See application file for complete search history.

(56) References Cited

U.S. PATENT DOCUMENTS

| 6,320,515 | B1 * | 11/2001 | Olsson ........................... 340/905 |
| 6,353,788 | B1 * | 3/2002 | Baker et al. ...................... 701/96 |
| 6,728,623 | B2 * | 4/2004 | Takenaga et al. ................. 701/96 |
| 8,290,665 | B2 * | 10/2012 | Placke et al. ..................... 701/43 |
| 2005/0024044 | A1 * | 2/2005 | Poirier et al. ............. 324/207.25 |
| 2005/0256630 | A1 | 11/2005 | Nishira et al. |
| 2007/0041552 | A1 * | 2/2007 | Moscato ................... 379/214.01 |
| 2008/0027607 | A1 * | 1/2008 | Ertl et al. .......................... 701/36 |
| 2008/0065293 | A1 * | 3/2008 | Placke et al. ..................... 701/41 |
| 2010/0332127 | A1 * | 12/2010 | Imai et al. ....................... 701/208 |

FOREIGN PATENT DOCUMENTS

| JP | 2001-101595 | 4/2001 |
| JP | 2005-011249 | 1/2005 |
| JP | 2005-039547 | 2/2005 |
| JP | 2007-112327 | 5/2007 |
| JP | 2010-211528 | 9/2010 |

* cited by examiner

*Primary Examiner* — Hussein A. Elchanti
(74) *Attorney, Agent, or Firm* — Harness, Dickey & Pierce, PLC (57) ABSTRACT

A driving support apparatus includes: a driving support controller for starting to execute a driving support control when a support start condition is met; a current position detector; and a driving direction determination unit for successively determining whether there is a possibility of a vehicle turning at an intersection in a direction, to which a blinker turns. The driving support controller sets an enforcement notification state when the driving direction determination unit determines the possibility after the driving support controller starts to execute the driving support control. The driving support control provides to notify information in the enforcement notification state even when the blinker turns off, and ends the enforcement notification state when the driving direction determination unit determines no possibility.

22 Claims, 5 Drawing Sheets

DRIVING SUPPORT APPARATUS

CROSS REFERENCE TO RELATED APPLICATION

This application is based on Japanese Patent Application No. 2010-291956 filed on Dec. 28, 2010, the disclosure of which is incorporated herein by reference.

TECHNICAL FIELD

The present invention relates to a driving support apparatus for supporting a driver to drive a vehicle when the vehicle turns right and left at an intersection.

BACKGROUND

A driving support apparatus for providing information about an oncoming vehicle when a vehicle turns right or left is described in JP-A-2005-11249. Here, when the apparatus determines to start providing the information according to only an instruction signal for turning on a blinker, or when the apparatus determines to start providing the information according to both of the instruction signal for turning on the blinker and a distance to the intersection, the apparatus may provide unnecessary information because the vehicle may merely change a traffic lane, or the vehicle may merely pass other vehicles. Thus, the user turns on a blinker not only a case where the vehicle turns right and left but also a case where the vehicle changes the lane or passes other vehicles.

Thus, in JP-A-2005-11249, the apparatus determines to start providing the information about the oncoming vehicle when the vehicle runs on a right side lane and turns on a right blinker. Further, except the following cases, the apparatus does not provide the information unless the right blinker is turning on even after the apparatus determines that the vehicle runs on the right side lane and turns on the right blinker. When the vehicle runs on a right-turn only lane, or when the apparatus detects an operation of the right blinker again, the apparatus provides the information. Thus, the apparatus does not provide unnecessary information when the driver turns on the right blinker to change the lane or to pass other vehicles.

Here, in the above cases, a traffic regulation complies with a left-hand traffic, and a road, on which the vehicle runs, has two lanes each way. When a driver in a country keeps to a right side of a road, the right and left sides are reversed.

In a prior art described in JP-A-2005-11249, a technique is described such that the apparatus notifies whether a pedestrian exists on a crosswalk, which is to be passed after the vehicle turns right at the intersection.

In JP-A-2005-11249, since the apparatus restricts unnecessary information service, the apparatus does not provide the information unless the right blinker is turning on except the right-turn lonely lane and detection of operation of the right blinker again.

However, in view of an actual situation such that the vehicle turns right, passes the intersection, and passes the crosswalk after the right blinker turns on before the intersection, the blinker may turn off since the steering wheel slightly returns. Accordingly, although it is necessary to provide the information, the apparatus may not provide the information.

Although JP-A-2005-11249 teaches a case where the apparatus provides the information when the vehicle turns right, the apparatus may provide the information when the vehicle turns left. In this case, if the condition for providing the information is that the left blinker is turning on, the apparatus may not provide the information although it is necessary to provide the information.

SUMMARY

In view of the above-described problem, it is an object of the present disclosure to provide a driving support apparatus for supporting a driver to drive a vehicle when the vehicle turns right and left at an intersection. The apparatus restricts unnecessary information service and reliably provides necessary information.

According to an aspect of the present disclosure, a driving support apparatus includes: a driving support controller for starting to execute a driving support control when a support start condition is met, wherein the driving support control provides to notify information for supporting a driver of a vehicle when the vehicle turns right or left at an intersection, the support start condition includes a condition that the vehicle enters into a driving support area and a condition that the driver turns on a blinker of the vehicle, and the driving support area includes the intersection and a near side of the intersection; a current position detector for detecting a current position of the vehicle; and a driving direction determination unit for successively determining based on the current position of the vehicle whether there is a possibility of the vehicle turning at the intersection in a direction, to which the blinker turns, instead of going through the intersection along with a same direction as a driving direction of the vehicle before the intersection. The driving support controller sets an enforcement notification state when the driving direction determination unit determines that there is a possibility of the vehicle turning at the intersection in the direction, to which the blinker turns, after the driving support controller starts to execute the driving support control. The driving support control provides to notify information in the enforcement notification state even when the blinker turns off. The driving support controller ends the enforcement notification state when the driving direction determination unit determines that there is no possibility of the vehicle turning at the intersection in the direction, to which the blinker turns.

In the above apparatus, even if the blinker turns off after the driving support controller starts to execute the driving support control, the driving support controller maintains to execute the driving support control when there is a possibility of the vehicle turning at the intersection in a direction, to which the blinker turns. Thus, the apparatus reliably provides necessary information when it is necessary to provide the information. Further, the driving support controller ends the enforcement notification state when the driving direction determination unit determines that there is no possibility of the vehicle turning at the intersection in the direction, to which the blinker turns. Here, the determination of the possibility of the vehicle is capable of performing while the vehicle is disposed in the intersection. Accordingly, the apparatus restricts unnecessary information service. The condition of the information service in the enforcement notification state includes, for example, a condition of existence of an object body, which is necessary to be noticed. Alternatively, all the time when the driving support controller sets the enforcement notification state, the apparatus notices information about the object body including information of non-existence of the body.

According to another aspect of the present disclosure, a driving support apparatus includes: a driving support controller for starting to execute a driving support control when a support start condition is met, wherein the driving support control provides to notify information for supporting a driver of a vehicle when the vehicle turns right or left at an intersection, the support start condition includes a condition that the vehicle enters into a driving support area and a condition that the driver turns on a blinker of the vehicle, and the driving support area includes the intersection and a near side of the intersection; a current position detector for detecting a current position of the vehicle; and a driving direction determination unit for successively determining based on the current position of the vehicle whether there is a possibility of the vehicle turning at the intersection in a direction, to which the blinker turns, instead of going through the intersection along with a same direction as a driving direction of the vehicle before the intersection. The driving support controller sets an enforcement notification state when the driving direction determination unit determines that there is a possibility of the vehicle turning at the intersection in the direction, to which the blinker turns, after the driving support controller starts to execute the driving support control. The driving support control provides to notify information in the enforcement notification state without relying on the condition that the driver turns on the blinker of the vehicle. The driving support controller ends the enforcement notification state when the driving direction determination unit determines that there is no possibility of the vehicle turning at the intersection in the direction, to which the blinker turns.

In the above apparatus, the apparatus reliably provides necessary information when it is necessary to provide the information. Further, the apparatus restricts unnecessary information service.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

The following embodiments correspond to an area, which provides a left-hand traffic regulation. Another area may provide a right-hand traffic regulation. In this case, the right side and left side are reversed.

Figure 1:
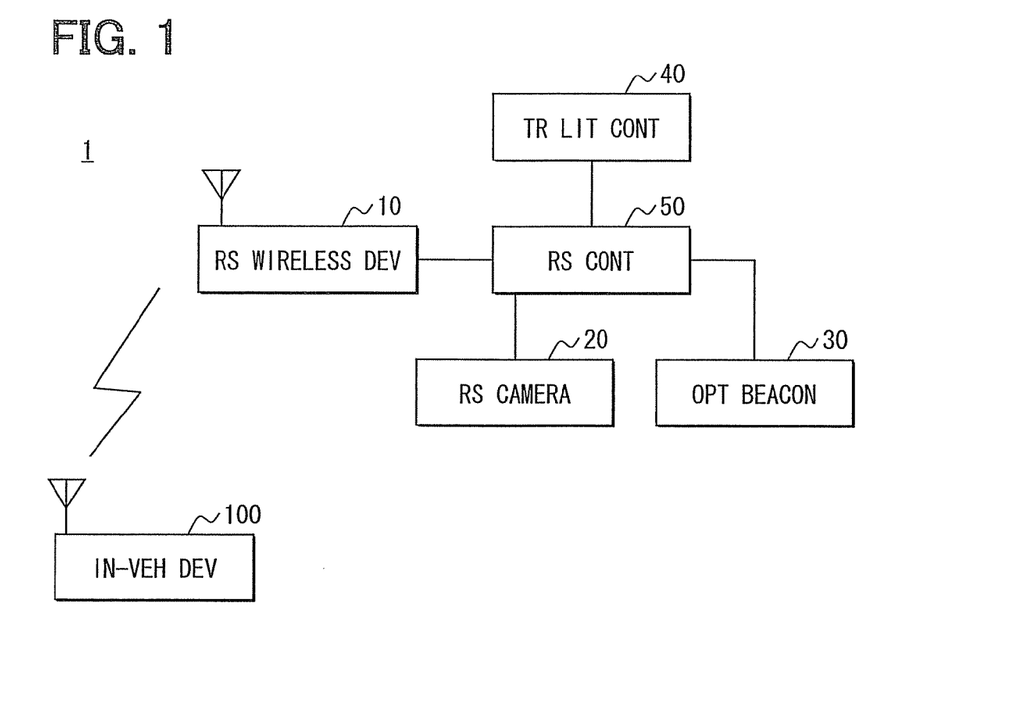
FIG. 1 is a diagram showing a driving support system.

FIG. 1 shows a whole of a driving support system 1. The system 1 includes a roadside wireless device 10, a roadside camera 20, an optical beacon 30, a traffic light controller 40, and a roadside controller 50. These elements 10-50 are infrastructure side elements. The system 1 further includes an in-vehicle device 100 in addition to the infrastructure side elements.

Figure 2:
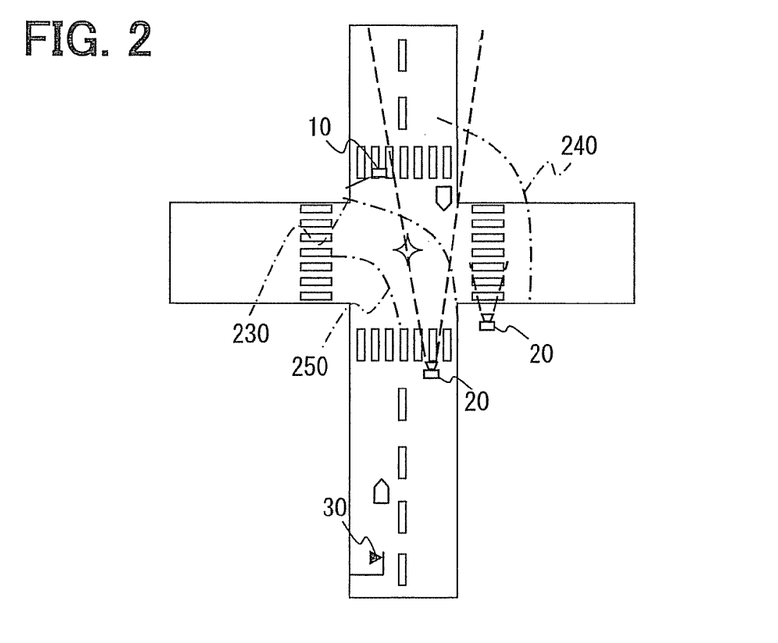
FIG. 2 is a diagram showing arrangements of a roadside wireless device, a roadside camera and an optical beacon.

As shown in FIG. 2, for example, the roadside wireless device 10 is arranged at a predetermined position of an intersection. Specifically, the roadside wireless device 10 is arranged on a crosswalk at the intersection. The roadside wireless device 10 transmits intersection traffic information in all directions with using an electric wave having a predetermined frequency band such as a 700 MHz band. The intersection traffic information includes information showing a signal cycle of a traffic light at the intersection, at which the roadside wireless device 10 is arranged, information of a moving body, which runs on a road toward the intersection, and information showing existence of the moving body on the crosswalk and around the crosswalk at the intersection.

The roadside camera 20 is arranged on the road. The camera 20 is arranged over the road toward the intersection at a position facing the intersection so that the camera 20 shoots a vehicle, which is to enter the intersection. Specifically, the camera 20 is disposed over a lane of the road, on which the vehicle runs toward the intersection. Further, another roadside camera 20 is arranged over the crosswalk at the intersection so that the camera 20 shoots the crosswalk around the intersection. In FIG. 2, one camera 20 disposed over the road and one camera 20 disposed over the crosswalk are shown. Actually, multiple cameras 20 are arranged over the road so that multiple cameras 20 can shoot each road, which is connected to the intersection. Further, multiple cameras 20 are arranged over the crosswalk so that multiple cameras 20 can shoot each crosswalk around the intersection. The cameras 20 and the roadside controller 50 are connected with each other via a wire. Thus, each camera 20 outputs an image signal corresponding to the shot image to the controller 50.

The optical beacons 30 are arranged over the road at each lane at various positions. For example, the beacon 30 is arranged over the road at the position just before the intersection or just after the intersection. The optical beacon 30 transmits traffic information and information about a distance to the next intersection and a road shape at the next intersection toward vehicles, which pass the road under the beacon 30. Further, the beacon 30 detects the vehicle, which passes under the beacon 30, in an interactive communication manner with an optical beacon antenna 160 on the vehicle. The beacon 30 is connected to the controller 50 via a wire. When the beacon 30 detects the vehicle passing under the beacon 30, the beacon transmits a signal to the roadside controller 50, the signal showing information that the vehicle passes under the beacon 30. The camera 20 and the beacon 30 may communicate with the controller 50 wirelessly.

The traffic signal controller 40 periodically switches the traffic lights in a predetermined order. The traffic lights are arranged at the intersection. Further, the traffic light controller 40 sequentially transmits information showing a color of each traffic light at the intersection to the roadside controller 50.

The roadside controller 50 is a computer having a CPU, a ROM and a RAM. The CPU executes a program stored in the ROM with using a temporally memorizing function of the RAM. Thus, the roadside controller 50 executes a moving body detection process and an information transmission process. In the moving body detection process, when the image shot by the camera 20 is analyzed, the controller 50 detects the moving body, which runs on the road toward the intersection. Further, the controller 50 detects the moving body, which is disposed on the crosswalk and around the intersection.

In the information transmission process, the controller 50 controls the roadside wireless device 10 to transmit information about a position of the detected moving body in the moving body detection process, a color of each traffic light in a predetermined time interval from present time to predetermined time, and a road shape at the intersection, which is preliminary stored. Here, the predetermined time interval from the present time to the predetermined time corresponds to predetermined cycles of the traffic lights such as two cycles.

Figure 3:
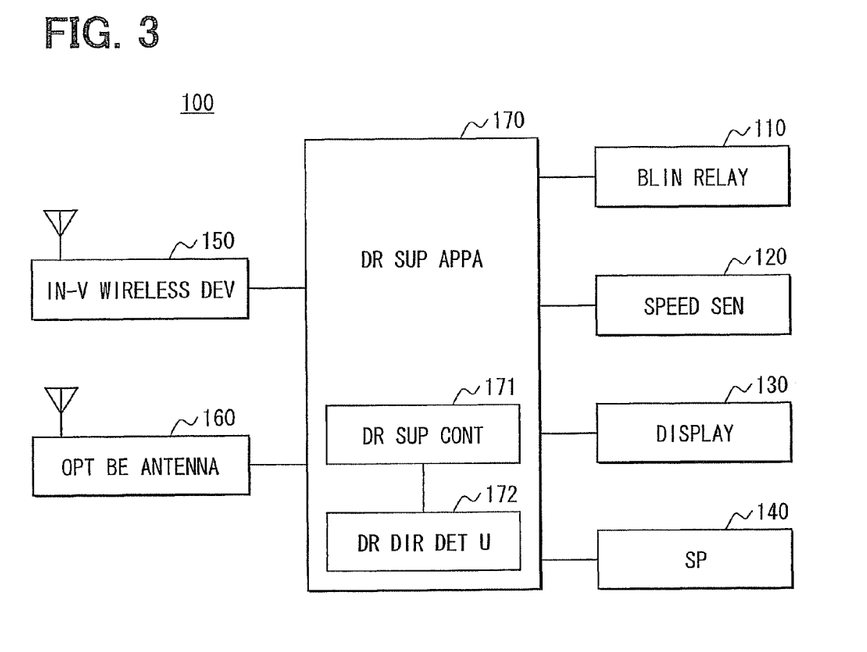
FIG. 3 is a diagram showing an in-vehicle device.

Next, the in-vehicle device 100 will be explained with reference to FIG. 3. The in-vehicle device 100 includes a blinker relay 110, a vehicle speed sensor 120, a display 130, a speaker 140, an in-vehicle wireless device 150, the optical beacon antenna 160 and the driving support device 170, which is connected to the blinker relay 110, the vehicle speed sensor 120, the display 130, the speaker 140, the in-vehicle wireless device 150, and the optical beacon antenna 160.

When the blinker relay 110 is energized, the blinker (i.e., the indicator) periodically blinks on and off (i.e., turns on). The energization (i.e., connection) and disconnection of the blinker relay 110 are switched in association with a blinker lever. When the user operates the blinker lever to the left, the blinker relay connecting to the left blinker is energized. When the user operates the blinker lever to the right, the blinker relay connecting to the right blinker is energized. The status of the blinker relay 110 such as the connection status and disconnection status is output to the driving support apparatus 170.

The vehicle speed sensor 120 detects a vehicle speed pulse in proportion to the vehicle speed. The vehicle speed pulse or a vehicle speed signal corresponding to the vehicle speed pulse is input into the driving support apparatus 170. The display 130 is arranged at a predetermined position in a compartment of the vehicle so that a driver on a driver seat can see the display 130. The display 130 displays a driving support screen image when the vehicle turns right or left. The screen image for starting drive support is, for example, shown in FIG. 4. When the apparatus 170 is ready for starting the dive support, the display 130 displays a shape of an intersection, which is preliminarily set. Further, the display overlaps a subject vehicle icon 200 (i.e., subject vehicle figure) over an intersection image. The subject vehicle icon 200 shows a position of the vehicle. When the apparatus 170 determine according to the signal from the roadside wireless device 10 that an oncoming vehicle exists, the display 130 displays an oncoming vehicle icon 210 (i.e., the oncoming vehicle figure). When the apparatus 170 determine according to the signal from the roadside wireless device 10 that a moving body such as a pedestrian exists on the crosswalk or around the crosswalk, the display 130 displays a moving body icon 220 (i.e., the moving body figure). Here, although the display 130 displays the driving support screen image, the driving support screen image is merely an example. The speaker 140 outputs predetermined sound when the content of the driving support screen image is changed.

The in-vehicle wireless device 150 receives the electric wave transmitted from the roadside wireless device 10. The in-vehicle wireless device 150 demodulates the received electric wave, and hen, the demodulated electric wave is input into the driving support apparatus 170. The optical beacon antenna 160 transmits a signal to and receives a signal from the optical beacon 30, which is arranged on the road.

The driving support apparatus 170 is a computer having a CPU, a ROM, a RAM and the like. The CPU executes a program stored in the ROM with using a temporally memorizing function in the RAM. Thus, the driving support apparatus 170 provides a driving support controller 171 and a driving direction determination unit 172. The driving support controller 171 executes a driving support process when the vehicle turns right or left at the intersection. The driving direction determination unit 172 provides a driving direction determination process for determining whether the vehicle turns right or left at the intersection or the vehicle goes straight through the intersection.

The driving support controller 171 starts to execute the driving support process under a condition that a support start condition is met. The support start condition is met, for example, when the vehicle is disposed in a predetermined driving support area including the intersection, and further, it is determined that the blinker turns on.

The starting point of the driving support area is a position at which the in-vehicle device 100 starts to receive the signal from the roadside wireless device 10. The determination whether the vehicle enters into the driving support area may be performed according to the determination whether the in-vehicle wireless device 150 can receive the signal from the roadside wireless device 10. Alternatively, the in-vehicle device 100 may determine that the vehicle enters into the driving support area when the vehicle passes under the optical beacon 30. Alternatively, the in-vehicle device 100 may determine according to current position information and map information obtained from a navigation device whether the vehicle enters into the driving support area. Further, the in-vehicle device 100 may determine according to a combination of the above information whether the vehicle enters into the driving support area.

The end point of the driving support area is a position, which is disposed after the intersection and the crosswalk so that the vehicle passes the intersection and the crosswalk. Alternatively, the end point of the driving support area is a position, which is disposed apart from the intersection and the crosswalk by a predetermined distance so that the vehicle passes the intersection and the crosswalk, and then, proceeds by a predetermined distance from the intersection and the crosswalk. The determination whether the vehicle passes through the end point of the driving support area may be performed according to a driving distance from a point at which the vehicle enters into the driving support area. Alternatively, the in-vehicle device 100 may determine according to the current position information obtained from the navigation device whether the vehicle passes through the end point of the driving support area. Alternatively, the in-vehicle device 100 may determine according to elapsed time from time when the vehicle enters into the driving support area.

The content of the drive support will be explained as follows. The driving support provides to notify the driver of information for supporting the driver to drive the vehicle when the vehicle turns right or left. The notification of the diving support is performed with using the display 130 and the speaker 140. The in-vehicle device 100 executes the notification of the driving support information when the in-vehicle device 100 determines that the right or left blinker turns on. The in-vehicle device 100 determines that the right or left blinker turns on when the blinker actually turns on or when an enforcement on-flag is raised.

Figure 4:
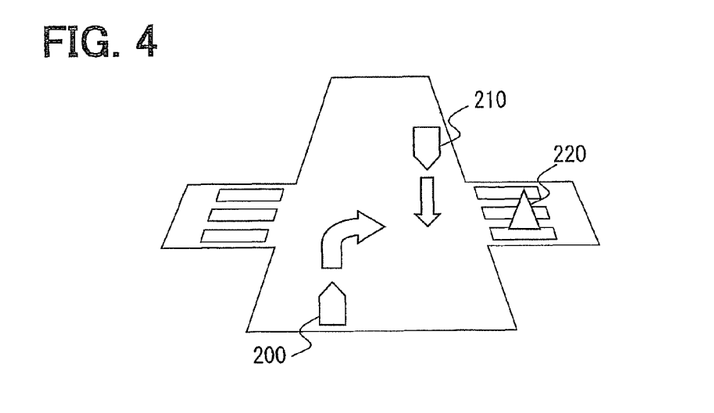
FIG. 4 is a diagram showing a screen image for starting drive support.

When the in-vehicle device 100 determines that the right blinker turns on, and the in-vehicle device 100 determines that another vehicle running on an oncoming lane and entering into the intersection exists, the display 130 displays the oncoming vehicle icon 210 at a predetermined position on the driving support screen image. When the in-vehicle device 100 determines that the moving body exists on the crosswalk or around the crosswalk, which the vehicle is to pass after the vehicle turns right, the display 130 displays the moving body icon 220 at a predetermined position on the driving support screen image. Further, when the oncoming vehicle icon 210 and the moving body icon 220 are displayed, the speaker 140 outputs predetermined sound.

When the in-vehicle device 100 determines that the left blinker turns on, and the in-vehicle device 100 determines that the moving body exists on the crosswalk or around the crosswalk, which the vehicle is to pass after the vehicle turns left, the display 130 displays the moving body icon 220 at a predetermined position on the driving support screen image. Further, when the moving body icon 220 is displayed, the speaker 140 outputs predetermined sound. The display of the driving support screen image and the sound output are performed when the traffic light at the intersection is green. Here, the existence of the oncoming vehicle and the moving body on the crosswalk or around the crosswalk and the status of the traffic light are determined based on information obtained from the roadside wireless device 10. The information from the roadside wireless device 10 includes information about a road other than the road, on which the vehicle runs. The driving support apparatus 170 selects the necessary information, and utilizes the information in the driving support process.

The driving support process ends when the support end condition is met. The support end condition is such that the in-vehicle device 100 determines that the vehicle is disposed outside of the driving support area.

During the driving support process, the driving direction determination unit 172 repeatedly executes the driving direction determination process for determining whether the vehicle goes straight through the intersection or turns right or left, until the in-vehicle device 100 conforms that the vehicle goes straight through the intersection or turns right or left. When the support start condition is met, and the right blinker turns on, the driving direction is determined according to a traveling direction at a position that the vehicle exceeds a right turn line 230. The right turn line 230 corresponds to a driving direction determination line when the vehicle turns right. Further, the right turn line 230 corresponds to a straight traveling determination line.

An example of the right turn line 230 is shown in FIG. 2. The right turn line 230 represents a boundary between an area, in which the in-vehicle device 100 cannot conform that the vehicle goes straight through the intersection or turns right or left, and an area, in which the in-vehicle device 100 can clearly conform that the vehicle goes straight through the intersection or turns right or left. Specifically, the right turn line 230 is used for determining whether the vehicle turns right at the intersection or the vehicle goes out from the intersection in a straight direction. As shown in FIG. 2, the right turn line 230 is a curve, i.e., an arc, which extends from a front side of the driving direction to the right lower direction. The right turn line 230 is disposed in the intersection, and passes through a point, which exceeds a center of the intersection viewing from the vehicle being to enter into the intersection. FIG. 2 also shows a driving support end line 240, which represents an end o the driving support area on the exit of the intersection. The driving support end line 240 is set to pass through a position, which exceeds the crosswalk.

As shown in FIG. 2 such that the right turn line 230 is disposed on the near side of the vehicle, and the driving support end line 240 is disposed on the far side of the vehicle, which is to enter into the intersection, the position of the vehicle is disposed in the driving support area after the driving support process starts and until the vehicle exceed the right turn line 230. Thus, when the vehicle turns right, the in-vehicle device 100 continues to execute the driving support process until the vehicle exceeds the right turn line 230. Specifically, in the present embodiment, the in-vehicle device 100 starts to execute the driving support process once, the in-vehicle device 100 continues to execute the driving support process unless it is clear that the driving direction of the vehicle is a straight direction or a right turn direction. Similar to the determination whether the vehicle passes through the end point of the driving support area, the determination whether the vehicle exceeds the right turn line 230 may be performed according to the driving distance from the entrance of the driving support area or the current position information obtained from the navigation device.

When the vehicle exceeds the right turn line 230 along with the straight direction, the in-vehicle device 100 determines that the vehicle goes straight through the intersection. Here, the determination whether the vehicle exceeds the right turn line 230 along with the straight direction or in the right turn direction is performed based on a steering wheel angle and a wheel angle at time when the vehicle exceeds the right turn line 230. Alternatively, the determination whether the vehicle exceeds the right turn line 230 along with the straight direction or in the right turn direction may be performed according to a driving trajectory (i.e., vehicle swept path).

Next, the determination of the driving direction will be explained in a case where the support start condition is met, and the left blinker turns on. The determination of the driving direction is performed according to the traveling direction of the vehicle at time when the vehicle exceeds a left turn line 250. The left turn line 250 corresponds to a driving direction determination line when the vehicle turns left. An example of the left turn line 250 is shown in FIG. 2. The left turn line 250 represents a boundary between an area, in which the in-vehicle device 100 cannot conform that the vehicle goes straight through the intersection or turns left, and an area, in which the in-vehicle device 100 can clearly conform that the vehicle goes straight through the intersection or turns left. Specifically, the left turn line 250 is used for determining whether the vehicle turns left at the intersection or the vehicle goes out from the intersection in a straight direction.

As shown in FIG. 2, the left turn line 250 is a curve, i.e., an arc, which extends from a center of the crosswalk, through which the vehicle is to pass when the vehicle turns left, to the center of the driving road. The left turn line 250 is disposed in the intersection, and passes through a point, which is disposed on the near side of the center of the intersection viewing from the vehicle being to enter into the intersection. When the vehicle goes straight through the intersection, the vehicle exceeds the left turn line 250. When the vehicle turns left, the vehicle does not exceed the left turn line 250. Accordingly, when the vehicle exceeds the left turn line 250, the in-vehicle device 100 determines that the vehicle goes straight through the intersection. Here, the determination whether the vehicle exceeds the left turn line 250, is performed similar to the determination whether the vehicle exceeds the right turn line 230. Here, the position of the left turn line 250 and the position of the right turn line 230 may be defined from information from the roadside wireless device 10. Alternatively, the position of the left turn line 250 and the position of the right turn line 230 may be obtained from the navigation device. Alternatively, the position of the left turn line 250 and the position of the right turn line 230 may be stored preliminary in the driving support apparatus 170.

Next, a process executed by the driving support apparatus 170 will be explained with reference to a flowchart in FIG. 5. In step S1, the driving support apparatus 170 determines whether the vehicle enters into a service area. Specifically, in step S1, the apparatus 170 determines whether the vehicle enters into the driving support area, which is the service area. When the determination in step S1 is "NO," it returns. And, the apparatus 170 repeats step S1. When the determination in step S1 is "YES," it goes to step S2.

In step S2, the apparatus 170 determines whether the driving support is performed. Step S2 corresponds to the process for determining the driving support in FIG. 6. In FIG. 6, in step S20, the apparatus 170 determines the status of the enforcement on-flag. The enforcement on-flag defines that the status of the blinker is regarded as an on-state when the enforcement on-flag is in an on-state even if the actual status of the blinker is in the off-state. Specifically, the status of the blinker is regarded as an on-state without depending on the actual status of the blinker when the enforcement on-flag is in the on-state. In steps S21 to S26, the status of the enforcement on-flag is determined.

When the enforcement on-flag is in the on-state, it goes to step S25. When the enforcement on-flag is in the off-state, it goes to step S21. In step S21, the apparatus 170 determines whether the blinker turn on. When the right blinker turns on, it goes to step S22. In step S22, the right turn line 230 is set. When the left blinker turns on, it goes to step S23. In step S23, the left turn line 250 is set. When the right and left blinkers do not turn on, it goes to step S25. Even when the apparatus 170 determines that the vehicle enters into the service area, the determination in step S25 is "NO" under a condition that the right and left blinkers do not turn on, and the apparatus 170 determines in step S21 that the blinker turns off. Further, the determination in step S27 is also "NO." In this case, the apparatus 170 does not start to execute the driving support control process.

In step S22 or S23, when the apparatus sets the right turn line 230 or the left turn line 250, the apparatus 170 sets the enforcement on-flag in step S24, i.e., the apparatus 170 sets the enforcement on-flag to be in the on-state. Then, it goes to step S25.

In step S25, the apparatus determines whether the vehicle goes straight trough the intersection. The determination in step S25 is performed according to the determination whether the vehicle exceeds the right turn line 230 when the apparatus 170 sets the right turn line 230. The determination in step S25 is performed according to the determination whether the vehicle exceeds the left turn line 250 when the apparatus 170 sets the left turn line 250. When the determination in step S25 is "YES," it goes to step S26. Then, the apparatus resets (i.e., clear) the enforcement on-flag to be in the off-state. Then, it goes to step S27. When the determination in step S25 is "NO," it goes to step S27 directly. Here, even when the apparatus 170 does not set the lines 230, 250, the apparatus determines "NO" in step S25 since the vehicle does not exceed the lines 230, 250.

In step S27, the apparatus 170 determines whether the apparatus 170 starts to execute the driving support process. In step S27, the apparatus 170 determines whether the blinker turns on. The apparatus 170 determines that the blinker turns on in a case where the blinker actually turns on, or the enforcement on-flag is in the on-state. The apparatus 170 sets the enforcement on-flag to be in the on-state in step S24. When the blinker turns on at least once, the enforcement on-flag remains in the on-state until the apparatus determines in step S25 that the vehicle goes straight through the intersection. Thus, until the apparatus determines in step S25 that the vehicle goes straight through the intersection, the condition that the blinker actually turns on does not limit the determination in step S27. In the present embodiment, the on-state of the enforcement on-flag corresponds to an enforced notification state. The off-state of the enforcement on-flag corresponds to a notification restriction state.

In step S27, when the apparatus 170 determines that the blinker turns off, the support start condition is not met. Further, the support determination process in FIG. 6 ends. When the apparatus 170 determines that the blinker turns on, the apparatus 170 further determines whether the oncoming vehicle exists, and the moving body exists on the crosswalk and around the crosswalk, through which the vehicle is to pass after the vehicle turns right or left. When the apparatus determines that both of the oncoming vehicle and the moving body do not exist, the support determination process in FIG. 6 ends. When at least one of the oncoming vehicle and the moving body exists, the support start condition is met, and then, it goes to step S28.

In step S28, the apparatus 170 sets a support flag in accordance with the determination result in step S27 so that various support steps are performed according to the determination result in step S27. Thus, the process for determining the drive support end.

Figure 5:
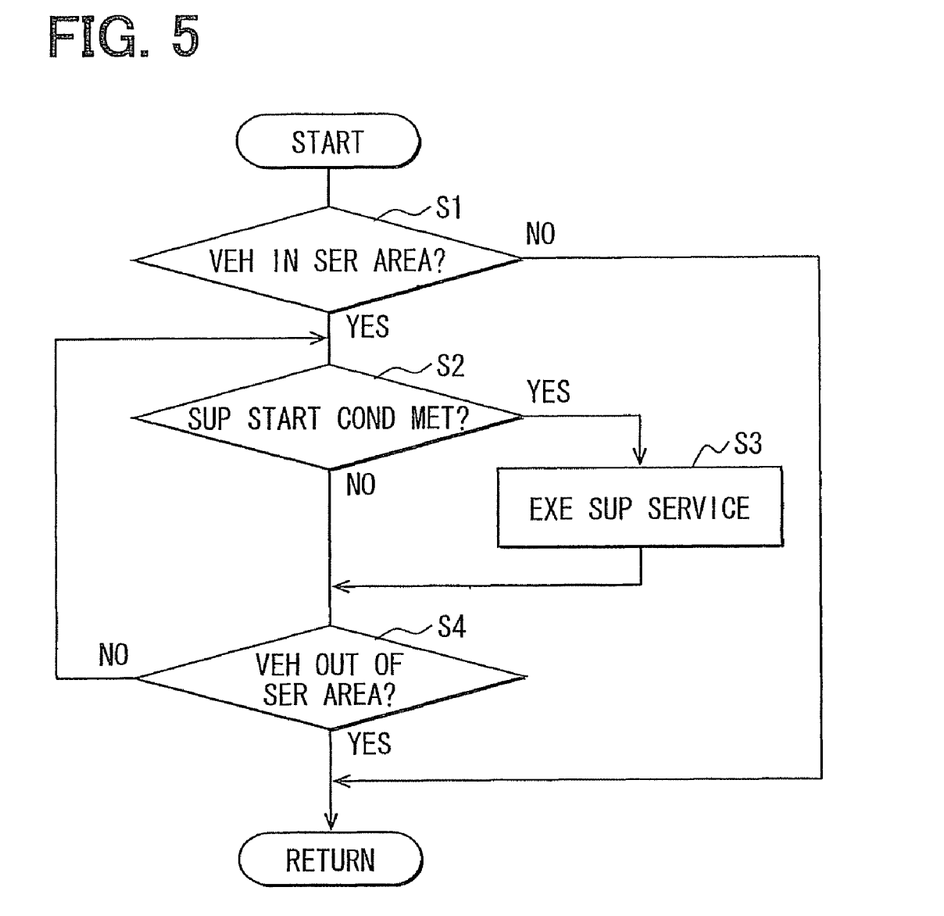
FIG. 5 is a flowchart showing a process in a driving support apparatus.
Figure 6:
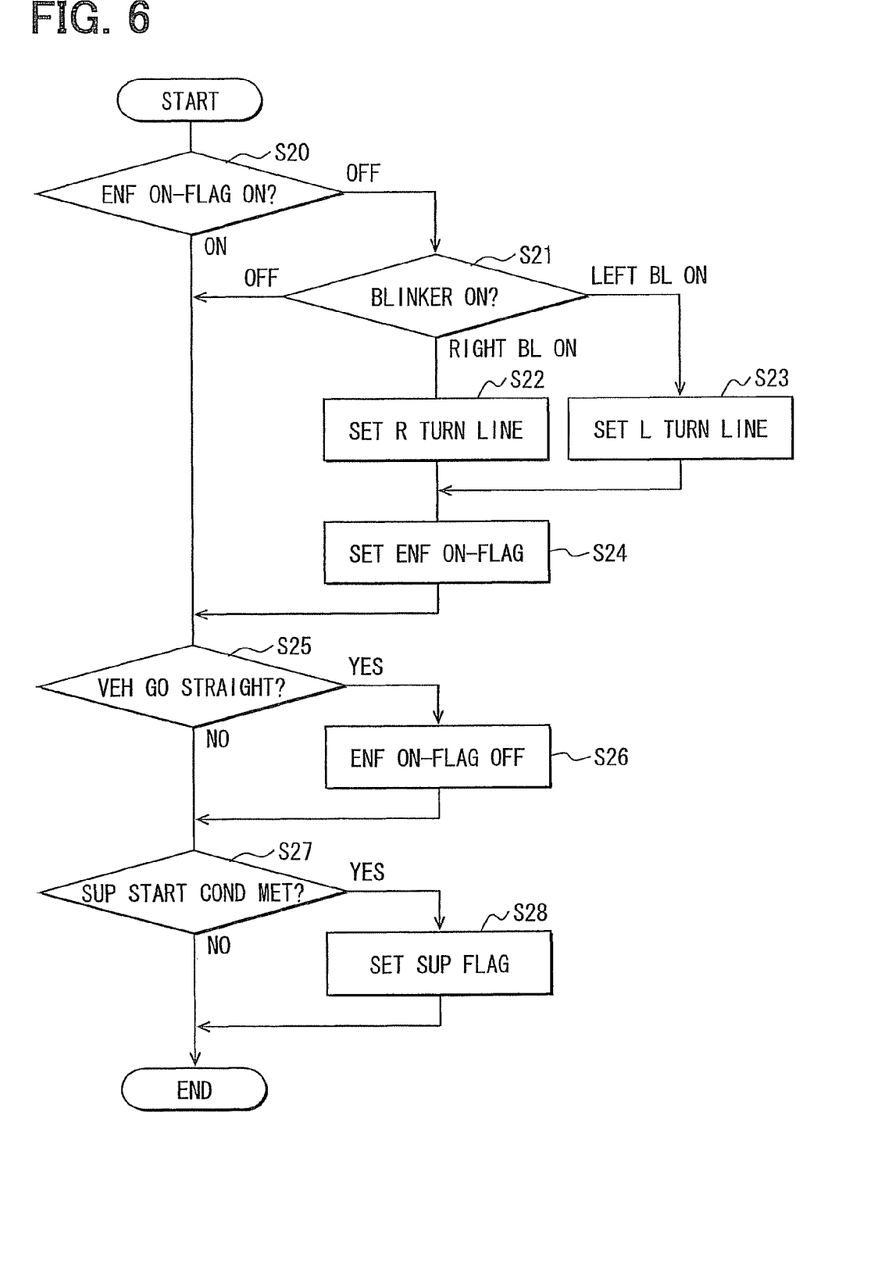
FIG. 6 is a flowchart showing a process for determining support.

As shown in FIG. 5, in the determination in step S2, when the support start condition is met, it goes to step S3. Then, the driving support is executed according to the support flag. Then, it goes to step S4. When the support start condition is not met, it goes to step S4 directly.

In step S4, the apparatus 170 determines whether the vehicle goes out of the service area, i.e., whether the vehicle is disposed out of the service, area. When the apparatus 170 determines that the vehicle is disposed in the service area, it returns to step S2. Then, the apparatus 170 repeats the support start process in FIG. 6. When the apparatus 170 determines that the vehicle is disposed out of the service area, it returns to step S1.

Thus, in the present embodiment, under a condition that the support start condition is met, the driving support device 170 starts to execute the driving support process for notifying the information so as to support the driver when the vehicle turns right or left. Further, during the driving support process, the apparatus 170 determines whether the vehicle exceeds the right turn line 230 or the left turn line 250, so that the apparatus 170 executes the driving direction determination process for determining whether the vehicle goes straight through the intersection.

When the vehicle does not exceed the right turn line 230 and the left turn line 250, i.e., when the apparatus does not confirm the driving direction of the vehicle, the apparatus 170 sets the enforcement on-flag. In this case, even when the blinker turns off, the apparatus sets the enforced notification state for notifying the information even if the blinker does not turn on. Thus, even when the blinker turns off after the apparatus 170 starts to execute the driving support process, the apparatus maintains the information notification status under a condition that the vehicle is disposed at a position, from which the vehicle can take either way to go straight through the intersection and to turn right or left at the intersection. Accordingly, when it is necessary to execute the information notification process, the apparatus 170 surely notifies the information. Specifically, when it is necessary to provide the information, a situation that the apparatus does not provide the information is avoidable.

Further, even if the information notification is unnecessary, when the apparatus 170 determines that the vehicle goes straight through the intersection, the enforcement on-flag is set to be the off-state. Thus, in this case, the information notification condition is that the blinker actually turns on. However, when the vehicle goes straight through the intersection, the blinker always turns off, and therefore, the information notification is restricted. Further, the determination whether the vehicle goes straight through the intersection is performed while the vehicle is disposed in the intersection. Accordingly, the unnecessary information notification is restricted, compared with a case where the apparatus continues to execute the driving support process after the driving support start condition is met until the vehicle goes out of the driving support area.

In the present embodiment, after the apparatus 170 determines that the vehicle enters into the service area, the apparatus 170 selects one of the right turn line 230 and the left turn line 250 in the driving direction determination step according to the side of the blinker, which is determined to turn on at the first time. The apparatus 170 sets the right turn line 230 at the position, which exceeds the center of the intersection with respect to the vehicle being to enter into the intersection. The apparatus 170 sets the left turn line 250 at the position, which is disposed on the near side of the center of the intersection with respect to the vehicle being to enter into the intersection. Accordingly, when the apparatus 170 uses the left turn line 250, the apparatus can determine the driving direction of the vehicle earlier than a case where the apparatus 170 uses the right turn line 230. Thus, the unnecessary information notification is completed earlier than the right turn line 250.

In the above embodiment, the apparatus 170 uses the right turn lien 230 and the left turn line 250 for determining the driving direction, and the apparatus 170 selects one of the right turn lien 230 and the left turn line 250 based on the side of the blinker. Alternatively, the driving support apparatus 170 may further include a lane type determination unit for determining the type of the lane, on which the vehicle runs. The driving direction determination unit 172 may set a line for determining the driving direction at a different position according to the type of the lane. The type of the lane may include a right side lane, a left side lane, a center lane and the like so that the type of the lane is determined by the position of the lane. Alternatively, the type of the lane may include a right turn only lane, a straight only lane and the like so that the type of the lane is determined by an allowed driving direction. For example, when the type of the lane is the center lane or the straight only lane, the apparatus may set the line for determining the driving direction at the position, which is disposed on the nearer side of the intersection than other lanes. In this case, the apparatus 170 can end the unnecessary driving support process earlier than a case where the apparatus 170 sets the line for determining the driving direction at the same position without depending on the type of the lane. Here, the determination of the type of the lane may be performed based on information from the optical beacon 30 when the vehicle passes under the beacon 30. Alternatively, the determination of the type of the lane may be performed based on information obtained from the navigation device.

Figure 7:
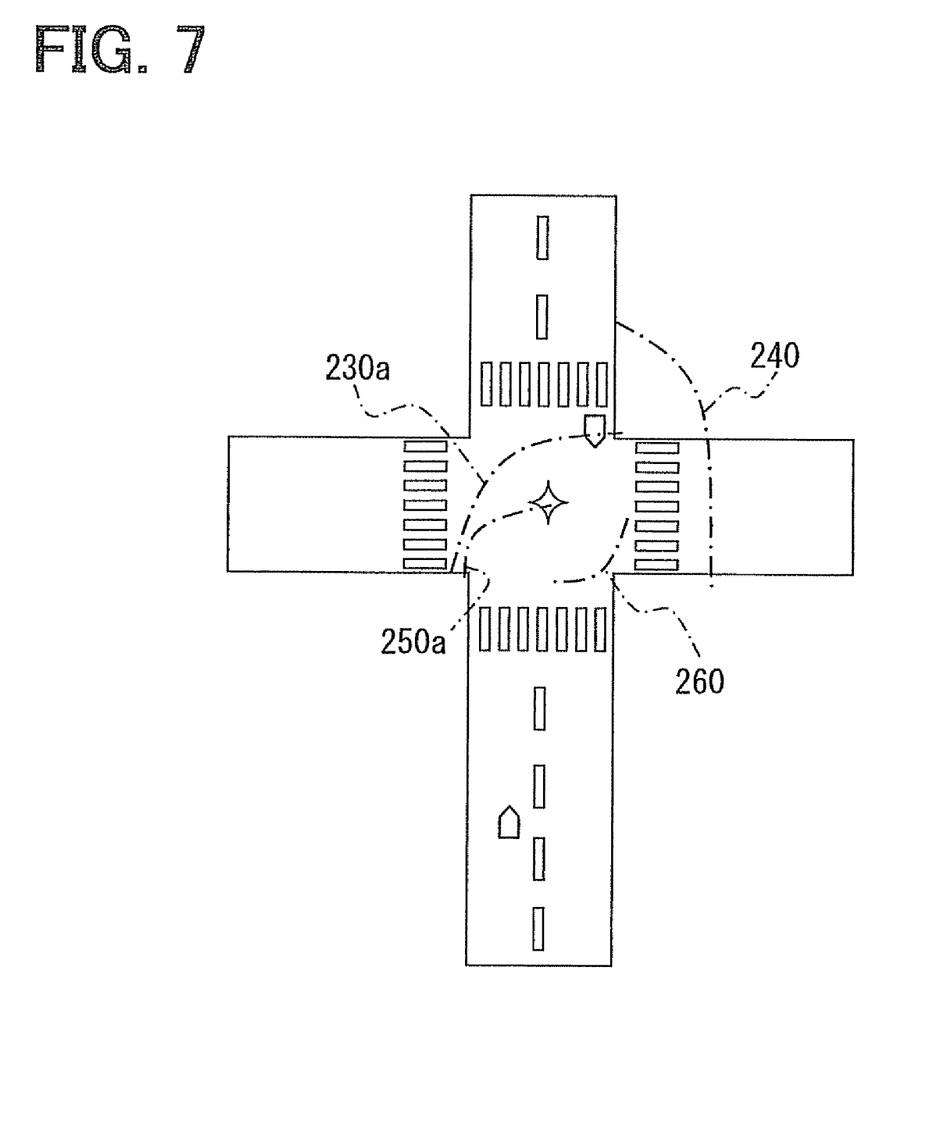
FIG. 7 is a diagram showing a right-turn line and a left-turn line.

In the above embodiment, the right turn line 230 is the arc, which extends from the far side of the intersection at the left corner to the near side of the intersection at the right corner so that the right turn line 230 is disposed nearer side of the intersection as it goes to the right side of the intersection along with the driving direction of the vehicle being to enter into the intersection. Alternatively, as shown in FIG. 7, the right turn line 230a may be the arc, which extends from the near side of the intersection at the left corner to the far side of the intersection at the right corner so that the right turn line 230a is disposed farther side of the intersection as it goes to the right side of the intersection along with the driving direction of the vehicle being to enter into the intersection. In this case, when the vehicle turns right, the vehicle does not exceed the right turn line 230a. When the vehicle goes straight through the intersection, the vehicle exceeds the right turn line 230a. Further, as shown in FIG. 7, the left turn line 250a may be the arc, which extends from the near side of the intersection at the left corner to the center of the intersection so that the left turn line 250a is disposed farther side of the intersection as it goes to the right side of the intersection along with the driving direction of the vehicle being to enter into the intersection.

In the above embodiment, the apparatus 170 determines one of three cases as the driving direction of the vehicle at the intersection, and the three cases include the straight case, the right turn case and the left turn case. Alternatively, the apparatus may determine one of four cases as the driving direction of the vehicle at the intersection, and the four cases include the straight case, the right turn case, the left turn case and a U-turn case. The determination of the U-turn case is performed with using a U-turn determination line 260 in FIG. 7, for example. The U-turn determination line 260 is disposed on an oncoming lane (i.e., an opposite lane) of the driving lane of the vehicle at the entrance of the intersection, into which the vehicle is to enter. Further, the U-turn determination line 260 is disposed on the near side of the center of the intersection. When the vehicle makes a U-turn, i.e., when the vehicle turns around at the intersection, the vehicle exceeds the U-turn determination line 260 since the U-turn determination line 260 is disposed on the opposite lane. Thus, the determination whether the vehicle turns around at the intersection is performed based on the U-turn determination line 260. When the apparatus 170 determines that the vehicle turns around at the intersection, the enforcement on-flag is reset. Since the U-turn determination line 260 is disposed in the intersection, the apparatus 170 quickly ends the unnecessary information notification process. Further, when the vehicle turns around, it is not necessary to provide the information about the oncoming vehicle. However, since the enforcement on-flag is set to be in the on-state until the apparatus determines that the vehicle turns around at the intersection, the apparatus 170 provides the information about the oncoming vehicle when the vehicle turns around at the intersection.

In the above embodiment, the line for determining the driving direction is the arc. Alternatively, the line for determining the driving direction may be a straight line, which is set in a direction crossing a driving track of the vehicle being to go straight through the intersection. The straight line is set at a position, for example, which is defined by a distance from a stop line of the traffic light. Further, in the above embodiment, the line provided by the arc has a center point at a predetermined position on the near side of the intersection at the left corner. Alternatively, the center point of the arc may be the center of the intersection.

In the above embodiment, the determination of the driving direction is performed based on the determination whether the vehicle exceeds the lien for determining the driving direction. Alternatively, the apparatus 170 may further include a steering wheel angle detection unit for detecting the steering wheel angle of the vehicle. The steering wheel angle is a steering angle. With using the steering angle, the apparatus 170 may determine successively whether the vehicle turns at the intersection to a direction, to which the blinker turns on.

For example, in the determination of the driving direction with using the steering angle, the apparatus 170 determines that the vehicle turns left when the steering angle is equal to or larger than a predetermined value. When the steering angle of the right side is equal to or larger than a first predetermined angle, and smaller than a second predetermined angle, and this condition continues for a predetermined time interval or a predetermine driving distance, the apparatus 170 determines that the vehicle turns right. When the steering angle of the right side is equal to or larger than the second predetermined angle, the apparatus 170 determines that the vehicle turns around.

In the above embodiment, the blinker relay 110 is not energized when the blinker lever is disposed at a neutral position. Alternatively, the blinker relay 110 may be in an energized state according to the signal from the apparatus 170 even when the blinker lever is disposed at a neutral position. The apparatus 170 further includes blinker control unit for turning the blinker on even when the blinker lever is disposed at the neutral position, until the apparatus determines that the vehicle goes out of the service area after the apparatus determines that the vehicle enters into the service area, or while the enforcement on-flag is in the on-state. In this case, the apparatus 170 informs other vehicles and pedestrians around the vehicle of the fact that the vehicle is to turn at the intersection. Thus, the safety is improved.

In the above embodiment, when the apparatus 170 determines that the vehicle goes straight through the intersection, the apparatus 170 sets the enforcement on-flag to be the off-state, and the determination in step S27 is executed. Specifically, even when the apparatus 170 determines that the vehicle goes straight through the intersection, the apparatus 170 continues to execute the driving support process. Alternatively, when the apparatus 170 determines that the vehicle goes straight through the intersection, the apparatus 170 may end the driving support process.

The condition for determining that the vehicle enters into the service area may further include the type of the lane. In this case, for example, when the vehicle runs on the right turn lane or the left turn lane, the apparatus may determine that the vehicle enters into the service area.

In the above embodiment, the driving support system 1 includes the roadside camera 20. Alternatively, the driving support system 1 may include a radar such as a millimeter wave radar. Alternatively, the apparatus 170 may determine based on the information from a vehicle-vehicle communication system (i.e., inter-vehicle communication system) whether the oncoming vehicle exists.

The above disclosure has the following aspects.

According to an aspect of the present disclosure, a driving support apparatus includes: a driving support controller for starting to execute a driving support control when a support start condition is met, wherein the driving support control provides to notify information for supporting a driver of a vehicle when the vehicle turns right or left at an intersection, the support start condition includes a condition that the vehicle enters into a driving support area and a condition that the driver turns on a blinker of the vehicle, and the driving support area includes the intersection and a near side of the intersection; a current position detector for detecting a current position of the vehicle; and a driving direction determination unit for successively determining based on the current position of the vehicle whether there is a possibility of the vehicle turning at the intersection in a direction, to which the blinker turns, instead of going through the intersection along with a same direction as a driving direction of the vehicle before the intersection. The driving support controller sets an enforcement notification state when the driving direction determination unit determines that there is a possibility of the vehicle turning at the intersection in the direction, to which the blinker turns, after the driving support controller starts to execute the driving support control. The driving support control provides to notify information in the enforcement notification state even when the blinker turns off. The driving support controller ends the enforcement notification state when the driving direction determination unit determines that there is no possibility of the vehicle turning at the intersection in the direction, to which the blinker turns.

In the above apparatus, even if the blinker turns off after the driving support controller starts to execute the driving support control, the driving support controller maintains to execute the driving support control when there is a possibility of the vehicle turning at the intersection in a direction, to which the blinker turns. Thus, the apparatus reliably provides necessary information when it is necessary to provide the information. Further, the driving support controller ends the enforcement notification state when the driving direction determination unit determines that there is no possibility of the vehicle turning at the intersection in the direction, to which the blinker turns. Here, the determination of the possibility of the vehicle is capable of performing while the vehicle is disposed in the intersection. Accordingly, the apparatus restricts unnecessary information service. The condition of the information service in the enforcement notification state includes, for example, a condition of existence of an object body, which is necessary to be noticed. Alternatively, all the time when the driving support controller sets the enforcement notification state, the apparatus notices information about the object body including information of non-existence of the body.

According to another aspect of the present disclosure, a driving support apparatus includes: a driving support controller for starting to execute a driving support control when a support start condition is met, wherein the driving support control provides to notify information for supporting a driver of a vehicle when the vehicle turns right or left at an intersection, the support start condition includes a condition that the vehicle enters into a driving support area and a condition that the driver turns on a blinker of the vehicle, and the driving support area includes the intersection and a near side of the intersection; a current position detector for detecting a current position of the vehicle; and a driving direction determination unit for successively determining based on the current position of the vehicle whether there is a possibility of the vehicle turning at the intersection in a direction, to which the blinker turns, instead of going through the intersection along with a same direction as a driving direction of the vehicle before the intersection. The driving support controller sets an enforcement notification state when the driving direction determination unit determines that there is a possibility of the vehicle turning at the intersection in the direction, to which the blinker turns, after the driving support controller starts to execute the driving support control. The driving support control provides to notify information in the enforcement notification state without relying on the condition that the driver turns on the blinker of the vehicle. The driving support controller ends the enforcement notification state when the driving direction determination unit determines that there is no possibility of the vehicle turning at the intersection in the direction, to which the blinker turns.

In the above apparatus, the apparatus reliably provides necessary information when it is necessary to provide the information. Further, the apparatus restricts unnecessary information service.

Alternatively, the driving direction determination unit may determine the driving direction of the vehicle based on information that the vehicle exceeds a driving direction determination line in the intersection. The driving direction determination line is a boundary in the intersection between an area, in which the driving direction is not fixed, and an area, in which the driving direction is fixed. Since the driving direction determination line is disposed in the intersection, the driving direction determination unit can determine whether there is a possibility of the vehicle turning at the intersection in the direction, to which the blinker turns, while the vehicle is disposed in the intersection.

Alternatively, the driving direction determination line may include a right turn determination line and a left turn determination line. The driving direction determination unit determines the driving direction of the vehicle with using the right turn determination line in a case where the driver turns on a right blinker of the vehicle when the support start condition is met. The right turn determination line for determining whether the vehicle turns right at the intersection or the vehicle goes out of the intersection in a direction other than a right turn direction is set in the intersection. The driving direction determination unit determines the driving direction of the vehicle with using the left turn determination line in a case where the driver turns on a left blinker of the vehicle when the support start condition is met. The left turn determination line for determining whether the vehicle turns left at the intersection or the vehicle goes out of the intersection in a direction other than a left turn direction is set in the intersection. Further, the driving direction determination line may further include at least one of a straight determination line and a U-turn determination line. The driving direction determination unit determines the driving direction of the vehicle with using the at least one of the straight determination line and the U-turn determination line in a case where the vehicle turns around at the intersection, and the driver turns on the blinker of the vehicle when the support start condition is met. The straight determination line for determining whether the vehicle goes straight through the intersection instead of turning at the intersection to a direction, which directs to an exit lane crossing an entrance lane at the intersection, is disposed at a position exceeding a center of the intersection with respect to the vehicle being to enter into the intersection. The U-turn determination line for determining whether the vehicle turns around at the intersection instead of turning at the intersection to a direction, which directs to the exit lane crossing the entrance lane at the intersection, is disposed at a position on a near side of the center of the intersection with respect to the vehicle being to enter into the intersection. The U-turn determination line is disposed on an opposite lane of the entrance lane of the intersection, on which the vehicle runs. Here, when the vehicle turns around at the intersection, the driver turns on the right blinker of the vehicle in a case where an area, in which the vehicle runs, provides a left-hand traffic regulation. When the vehicle turns around at the intersection, the driver turns on the left blinker of the vehicle in a case where an area, in which the vehicle runs, provides a right-hand traffic regulation.

Alternatively, one of the right turn determination line and the left turn determination line, which provides determination of a turning direction opposite to a direction of the blinker that turns on when the vehicle turns around, may be disposed on a near side of the center of the intersection with respect to the vehicle being to enter into the intersection. In this case, the determination with using the left turn determination line is performed earlier than the determination with using the straight determination line. Thus, the apparatus can end the unnecessary information service quickly.

Alternatively, the driving support apparatus may further include: a steering wheel angle detector for detecting a steering wheel angle of the vehicle. The driving direction determination unit successively determines based on the current position of the vehicle and the steering wheel angle whether there is a possibility of the vehicle turning at the intersection in a direction, to which the blinker turns. In some cases, the determination of the driving direction with using the steering wheel angle is performed earlier than the determination of the driving direction with using the current position of the vehicle. Thus, the apparatus can end the unnecessary information service quickly.

Alternatively, the driving support apparatus may further include: a lane type determination unit for determining a type of a driving lane. The driving direction determination unit sets the driving direction determination line at a position in accordance with the type of the driving lane. In this case, the apparatus can end the unnecessary information service quickly, compared with a case where the driving direction determination line is defined at the same position regardless of the type of the driving lane.

Alternatively, the driving support apparatus may further include: a blinker controller for continuing to turn on the blinker after the support start condition is met even when a blinker lever is disposed at a neutral position in a case where the driving support controller executes the driving support control. Even if the blinker lever is disposed at the neutral position, the vehicle may turn at the intersection to the direction, to which the blinker turns when the support start condition is met. Accordingly, even in such a case, the apparatus informs the information that the vehicle turns at the intersection to other vehicles and pedestrians around the vehicle. Thus, the safety is improved.

Alternatively, the driving support controller may set a notification restriction state when the driving support controller ends the enforcement notification state. The driving support control restricts notifying information in the notification restriction state when the vehicle goes toward a direction other than the direction, to which the blinker turns. Further, the driving support control may provide to notify information in the notification restriction state under a condition that the blinker turns on. In this case, when the vehicle goes straight through the intersection, the blinker does not turn on. Thus, when the vehicle goes straight through the intersection, the information service is restricted. Further, the notification restriction state may provide to end the driving support control. In this case, when the vehicle goes straight through the intersection, the information service is not performed While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A driving support apparatus comprising:
   a driving support controller for starting to execute a driving support control when a support start condition is met, wherein the driving support control provides to notify information for supporting a driver of a vehicle when the vehicle turns right or left at an intersection, the support start condition includes a condition that the vehicle enters into a driving support area and a condition that the driver turns on a blinker of the vehicle, and the driving support area includes the intersection and a near side of the intersection;
   a current position detector for detecting a current position of the vehicle; and
   a driving direction determination unit for successively determining based on the current position of the vehicle whether there is a possibility of the vehicle turning at the intersection in a direction, to which the blinker turns, instead of going through the intersection along with a same direction as a driving direction of the vehicle before the intersection,
   wherein the driving support controller sets an enforcement notification state when the driving direction determination unit determines that there is a possibility of the vehicle turning at the intersection in the direction, to which the blinker turns, after the driving support controller starts to execute the driving support control, wherein the driving support control provides to notify information in the enforcement notification state even when the blinker turns off, and wherein the driving support controller ends the enforcement notification state when the driving direction determination unit determines that there is no possibility of the vehicle turning at the intersection in the direction, to which the blinker turns.

2. The driving support apparatus according to claim 1, wherein the driving direction determination unit determines the driving direction of the vehicle based on information that the vehicle exceeds a driving direction determination line in the intersection, and wherein the driving direction determination line is a boundary in the intersection between an area, in which the driving direction is not fixed, and an area, in which the driving direction is fixed.

3. The driving support apparatus according to claim 2, wherein the driving direction determination line includes a right turn determination line and a left turn determination line, wherein the driving direction determination unit determines the driving direction of the vehicle with using the right turn determination line in a case where the driver turns on a right blinker of the vehicle when the support start condition is met, wherein the right turn determination line for determining whether the vehicle turns right at the intersection or the vehicle goes out of the intersection in a direction other than a right turn direction is set in the intersection, wherein the driving direction determination unit determines the driving direction of the vehicle with using the left turn determination line in a case where the driver turns on a left blinker of the vehicle when the support start condition is met, and wherein the left turn determination line for determining whether the vehicle turns left at the intersection or the vehicle goes out of the intersection in a direction other than a left turn direction is set in the intersection.

4. The driving support apparatus according to claim 3, wherein the driving direction determination line further includes at least one of a straight determination line and a U-turn determination line, wherein the driving direction determination unit determines the driving direction of the vehicle with using the at least one of the straight determination line and the U-turn determination line in a case where the vehicle turns around at the intersection, and the driver turns on the blinker of the vehicle when the support start condition is met, wherein the straight determination line for determining whether the vehicle goes straight through the intersection instead of turning at the intersection to a direction, which directs to an exit lane crossing an entrance lane at the intersection, is disposed at a position exceeding a center of the intersection with respect to the vehicle being to enter into the intersection, wherein the U-turn determination line for determining whether the vehicle turns around at the intersection instead of turning at the intersection to a direction, which directs to the exit lane crossing the entrance lane at the intersection, is disposed at a position on a near side of the center of the intersection with respect to the vehicle being to enter into the intersection, and wherein the U-turn determination line is disposed on an opposite lane of the entrance lane of the intersection, on which the vehicle runs.

5. The driving support apparatus according to claim 3, wherein one of the right turn determination line and the left turn determination line, which provides determination of a turning direction opposite to a direction of the blinker that turns on when the vehicle turns around, is disposed on a near side of the center of the intersection with respect to the vehicle being to enter into the intersection.

6. The driving support apparatus according to claim 1, further comprising:

a steering wheel angle detector for detecting a steering wheel angle of the vehicle, wherein the driving direction determination unit successively determines based on the current position of the vehicle and the steering wheel angle whether there is a possibility of the vehicle turning at the intersection in a direction, to which the blinker turns.

7. The driving support apparatus according to claim 2, further comprising:

a lane type determination unit for determining a type of a driving lane, wherein the driving direction determination unit sets the driving direction determination line at a position in accordance with the type of the driving lane.

8. The driving support apparatus according to claim 1, further comprising:

a blinker controller for continuing to turn on the blinker after the support start condition is met even when a blinker lever is disposed at a neutral position in a case where the driving support controller executes the driving support control.

9. The driving support apparatus according to claim 1, wherein the driving support controller sets an notification restriction state when the driving support controller ends the enforcement notification state, and wherein the driving support control restricts notifying information in the notification restriction state when the vehicle goes toward a direction other than the direction, to which the blinker turns.

10. The driving support apparatus according to claim 9, wherein the driving support control provides to notify information in the notification restriction state under a condition that the blinker turns on.

11. The driving support apparatus according to claim 9, wherein the notification restriction state provides to end the driving support control.

12. A driving support apparatus comprising:

a driving support controller for starting to execute a driving support control when a support start condition is met, wherein the driving support control provides to notify information for supporting a driver of a vehicle when the vehicle turns right or left at an intersection, the support start condition includes a condition that the vehicle enters into a driving support area and a condition that the driver turns on a blinker of the vehicle, and the driving support area includes the intersection and a near side of the intersection;

a current position detector for detecting a current position of the vehicle; and a driving direction determination unit for successively determining based on the current position of the vehicle whether there is a possibility of the vehicle turning at the intersection in a direction, to which the blinker turns, instead of going through the intersection along with a same direction as a driving direction of the vehicle before the intersection, wherein the driving support controller sets an enforcement notification state when the driving direction determination unit determines that there is a possibility of the vehicle turning at the intersection in the direction, to which the blinker turns, after the driving support controller starts to execute the driving support control, wherein the driving support control provides to notify information in the enforcement notification state without relying on the condition that the driver turns on the blinker of the vehicle, and wherein the driving support controller ends the enforcement notification state when the driving direction determination unit determines that there is no possibility of the vehicle turning at the intersection in the direction, to which the blinker turns.

13. The driving support apparatus according to claim 12, wherein the driving direction determination unit determines the driving direction of the vehicle based on information that the vehicle exceeds a driving direction determination line in the intersection, and wherein the driving direction determination line is a boundary in the intersection between an area, in which the driving direction is not fixed, and an area, in which the driving direction is fixed.

14. The driving support apparatus according to claim 13, wherein the driving direction determination line includes a right turn determination line and a left turn determination line, wherein the driving direction determination unit determines the driving direction of the vehicle with using the right turn determination line in a case where the driver turns on a right blinker of the vehicle when the support start condition is met, wherein the right turn determination line for determining whether the vehicle turns right at the intersection or the vehicle goes out of the intersection in a direction other than a right turn direction is set in the intersection, wherein the driving direction determination unit determines the driving direction of the vehicle with using the left turn determination line in a case where the driver turns on a left blinker of the vehicle when the support start condition is met, and wherein the left turn determination line for determining whether the vehicle turns left at the intersection or the vehicle goes out of the intersection in a direction other than a left turn direction is set in the intersection.

15. The driving support apparatus according to claim 14, wherein the driving direction determination line further includes at least one of a straight determination line and a U-turn determination line, wherein the driving direction determination unit determines the driving direction of the vehicle with using the at least one of the straight determination line and the U-turn determination line in a case where the vehicle turns around at the intersection, and the driver turns on the blinker of the vehicle when the support start condition is met, wherein the straight determination line for determining whether the vehicle goes straight through the intersection instead of turning at the intersection to a direction, which directs to an exit lane crossing an entrance lane at the intersection, is disposed at a position exceeding a center of the intersection with respect to the vehicle being to enter into the intersection, wherein the U-turn determination line for determining whether the vehicle turns around at the intersection instead of turning at the intersection to a direction, which directs to the exit lane crossing the entrance lane at the intersection, is disposed at a position on a near side of the center of the intersection with respect to the vehicle being to enter into the intersection, and wherein the U-turn determination line is disposed on an opposite lane of the entrance lane of the intersection, on which the vehicle runs.

16. The driving support apparatus according to claim 14, wherein one of the right turn determination line and the left turn determination line, which provides determination of a turning direction opposite to a direction of the blinker that turns on when the vehicle turns around, is disposed on a near side of the center of the intersection with respect to the vehicle being to enter into the intersection.

17. The driving support apparatus according to claim 12, further comprising:

a steering wheel angle detector for detecting a steering wheel angle of the vehicle, wherein the driving direction determination unit successively determines based on the current position of the vehicle and the steering wheel angle whether there is a possibility of the vehicle turning at the intersection in a direction, to which the blinker turns.

18. The driving support apparatus according to claim 13, further comprising:

a lane type determination unit for determining a type of a driving lane, wherein the driving direction determination unit sets the driving direction determination line at a position in accordance with the type of the driving lane.

19. The driving support apparatus according to claim 12, further comprising:

a blinker controller for continuing to turn on the blinker after the support start condition is met even when a blinker lever is disposed at a neutral position in a case where the driving support controller executes the driving support control.

20. The driving support apparatus according to claim 12, wherein the driving support controller sets an notification restriction state when the driving support controller ends the enforcement notification state, and wherein the driving support control restricts notifying information in the notification restriction state when the vehicle goes toward a direction other than the direction, to which the blinker turns.

21. The driving support apparatus according to claim 20, wherein the driving support control provides to notify information in the notification restriction state under a condition that the blinker turns on.

22. The driving support apparatus according to claim 20, wherein the notification restriction state provides to end the driving support control.

* * * * *